United States Patent
Nair

(10) Patent No.: US 8,050,693 B2
(45) Date of Patent: Nov. 1, 2011

(54) EMPLOYING THE SMS PROTOCOL AS A TRANSPORT LAYER PROTOCOL

(75) Inventor: Rahul Nair, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 653 days.

(21) Appl. No.: 11/695,340

(22) Filed: Apr. 2, 2007

(65) Prior Publication Data

US 2008/0242323 A1   Oct. 2, 2008

(51) Int. Cl.
  *H04W 4/00*  (2009.01)
(52) U.S. Cl. .......... 455/466; 455/412.1; 455/414.1; 709/206
(58) Field of Classification Search .......... 455/466, 455/412.1, 414.1, 567; 370/328; 709/227, 709/206, 237
See application file for complete search history.

(56) References Cited

U.S. PATENT DOCUMENTS

| | | | |
|---|---|---|---|
| 6,519,234 B1 * | 2/2003 | Werkander | 370/328 |
| 2004/0029598 A1 * | 2/2004 | Guggisberg | 455/466 |
| 2004/0170161 A1 * | 9/2004 | Laumen et al. | 370/352 |
| 2005/0250550 A1 * | 11/2005 | Fields | 455/567 |
| 2005/0266829 A1 * | 12/2005 | Tran et al. | 455/412.1 |
| 2005/0266831 A1 * | 12/2005 | Roth | 455/412.1 |
| 2007/0162296 A1 * | 7/2007 | Altberg et al. | 705/1 |
| 2008/0268823 A1 * | 10/2008 | Shalev et al. | 455/415 |

FOREIGN PATENT DOCUMENTS

WO   2006123174 A2   11/2006

OTHER PUBLICATIONS

Bentley, Frank et al., "Sharing Motion Information with Close Family and Friends," Motorola Labs, 2007, 10 pgs.

* cited by examiner

*Primary Examiner* — Kamran Afshar
*Assistant Examiner* — Mong-Thuy Tran
(74) *Attorney, Agent, or Firm* — Frommer Lawrence & Haug LLP; John W. Branch

(57) ABSTRACT

Communicating data by transforming images or other non-text data into subsets of text characters and communicating each subset in an electronic message that can carry only a limited number of text characters. An embodiment transforms portions of binary data of an image or other non-text data into subsets of hexadecimal data that represents text characters. The subsets of hexadecimal text character data are included in SMS messages that have a predefined maximum number of characters. A header is included in the SMS messages to identify the ordering of the data. The SMS messages are communicated to a receiving device that orders the messages, transforms each subset of hexadecimal text characters back into the binary data, and assembles the binary data into it prior form for rendering to a user of the receiving device. A server may process the SMS messages, such as by inserting additional SMS messages with advertising data.

21 Claims, 3 Drawing Sheets

EMPLOYING THE SMS PROTOCOL AS A TRANSPORT LAYER PROTOCOL

FIELD OF ART

The present invention is directed to electronic communication, and more specifically to communicating non-text data as text in a plurality of limited-size messages.

BACKGROUND

People use a variety of electronic devices and software programs to communicate. To exchange data, people often use general purpose computing devices that run software programs such as electronic mail, instant messaging, voice over internet protocol (VOIP), and/or other communication systems. Cell phones and other limited-capability devices can also be used to communicate, but they often have inherent limitations and/or network constraints that make it difficult to use the communication systems of general purpose computing devices. Consequently, limited-capability devices often use specialized communication programs and protocols such as short message service (SMS), multimedia message service (MMS), and the like. These often have limits on message sizes, communication speeds, data types, and the like. However, users often desire the capability to communicate large amounts, and various types of data, without having to use a large and/or stationary general purpose computing device. For example, users often wish to exchange images, video, audio, and/or other large amounts of data that is difficult and/or expensive to communicate with limited-capability devices.

Some communication systems enable users to exchange somewhat larger amounts of text data. For example, a multipart SMS system can split long text messages into multiple SMS messages. A user typically enters a long string of text that is larger than an individual SMS message. After completing the string of text, a multipart SMS system generally breaks the text into parts that fit within SMS messages. However, this is generally limited to text data and string of text is typically limited to a predefined maximum number of characters. Other types of data and boundless amounts of data generally can not be communicated with such systems. It is with respect to these and other issues that embodiments of the present invention are directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

An embodiment is described in terms of one or more mobile devices that have an ability to interface with one or more networks, optionally including multiple types of networks. In this example embodiment, the mobile devices may also interface with a server or other network node. However, the invention can be adapted to other environments.

Figure 1:
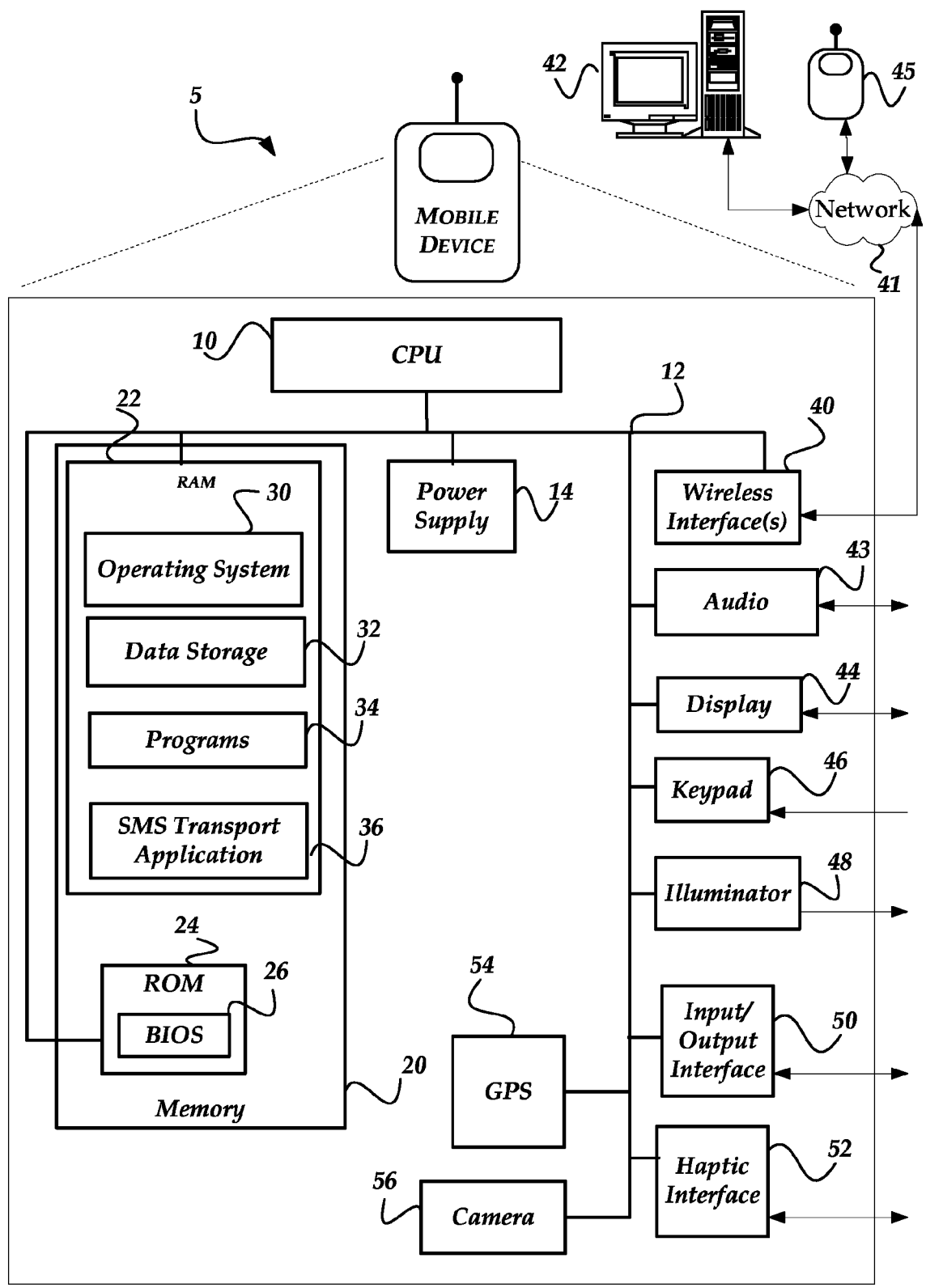
FIG. 1 shows an exemplary mobile device, according to one embodiment of the invention.

FIG. 1 shows an exemplary mobile device 5, according to one embodiment of the invention. Mobile device 5 may include many more components than those shown in FIG. 1. However, the components shown are sufficient to disclose an illustrative embodiment for practicing the present invention. In other embodiments, some the components may not be needed, and/or other known components may be included. A general purpose computing device, a server, or other network node may include the same or similar components.

In one embodiment, mobile device 5 is a cellular telephone that is arranged to send and receive voice communications and messages such as Short Messaging Service (SMS) messages via one or more wireless communication interfaces. Generally, mobile device 5 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile device 5 may also comprise other electronic devices that such as Personal Digital Assistants (PDAs), handheld computers, personal computers, multiprocessor systems, microprocessor-based or programmable consumer electronics, network PCs, wearable computers, and the like.

As shown in the figure, mobile device 5 includes a processing unit 10 in communication with a mass memory 20 via a bus 12. Mass memory 20 includes a RAM 22, a ROM 24, and other storage means. Mass memory 20 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 20 stores a basic input/output system ("BIOS") 26 for controlling low-level operation of mobile device 5. The mass memory also stores an operating system 30 for controlling the operation of mobile device 5. It will be appreciated that this component may include a general purpose operating system such as a version of UNIX or LINUX™, or a specialized mobile communication operating system such as the Symbian® operating system. The operating system may include, or interface with a Java™ virtual machine module that enables control of hardware components and/or operating system operations via Java™ application programs.

Memory 20 further includes one or more data storage units 32, which can be utilized by mobile device 5 to store, among other things, programs 34, databases and/or other data. Programs 34 may include computer executable instructions which, when executed by mobile device 5, transmit and receive SMS messages, e-mail, audio, video, web pages, and enable telecommunication with another user of another mobile device. In addition, mass memory 30 stores an SMS transport application 36, which may be stand-alone or work in conjunction with an application on a remote device such as a server, another mobile device, or the like. SMS transport application 36 may include one or more modules of computer executable instructions, which may be run under control of operating system 30 to process and communication data, including text data and non-text data. One or more modules may perform data transformation. Another one or more modules may manage sending operations. Yet another one or more modules may manage receiving operations. A further one or more modules may perform other processing, such as collecting statistics, inserting advertisements, adding links, determining usage fees, or the like. Any one or more of the modules may be included in a server other network node that is configured similar to mobile device 5.

Mobile device 5 also includes a power supply 14, one or more wireless interfaces 40, an audio interface 43, a display 44, a keypad 46, an illuminator 48, an input/output interface 50, a haptic interface 52, and an optional global positioning systems (GPS) receiver 54. Power supply 14 provides power to mobile device 5. A rechargeable or non-rechargeable battery may be used to provide power. The power may also be provided by an external power source, such as an AC adapter or a powered docking cradle that supplements and/or recharges a battery.

Mobile device 5 may optionally communicate with a base station (not shown), or directly with another mobile device. Wireless interface 40 enables mobile device 5 to communicate through a wireless network 41, to a wired telecommunications network, to a computer network, and/or to other networks coupled to remote devices such as a server 42, another mobile device 45, a wired telecommunications device, and the like. Wireless interface 40 includes circuitry for coupling mobile device 5 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), Wireless Application Protocol (WAP), ultra wide band (UWB), IEEE 802.16 Worldwide Interoperability for Microwave Access (WiMax), and the like.

Audio interface 43 is arranged to produce and receive audio signals such as the sound of a human voice. For example, audio interface 43 may be coupled to a speaker and microphone (not shown) to enable telecommunication with others and/or generate an audio acknowledgement for some action. Display 44 may be a liquid crystal display (LCD), gas plasma, light emitting diode (LED), or any other type of display used with a mobile device. Display 44 may also include a touch sensitive screen arranged to receive input from an object such as a stylus or a digit from a human hand.

Keypad 46 may comprise any input device arranged to receive input from a user. For example, keypad 46 may include a push button numeric dial, or a keyboard. Keypad 46 may also include command buttons that are associated with selecting and sending images. Illuminator 48 may provide a status indication and/or provide light. Illuminator 48 may remain active for specific periods of time or in response to events. For example, when illuminator 48 is active, it may backlight the buttons on keypad 46 and stay on while the mobile device is powered. Also, illuminator 48 may backlight these buttons in various patterns when particular actions are performed, such as dialing another mobile device. Illuminator 48 may also cause light sources positioned within a transparent or translucent case of the mobile device to illuminate in response to actions. Illuminator 48 may further be used as a flash and/or constant light source.

Mobile device 5 also comprises input/output interface 50 for communicating with external devices, such as a headset, or other input or output devices not shown in FIG. 1. Input/output interface 50 can utilize one or more communication technologies, such as USB, infrared, Bluetooth™, and the like. Haptic interface 52 is arranged to provide tactile feedback to a user of the mobile device. For example, the haptic interface may be employed to vibrate mobile device 5 in a particular way when another user of a mobile device is calling.

Optional GPS transceiver 54 can determine the physical coordinates of mobile device 5 on the surface of the Earth, which typically output a location as latitude and longitude values. GPS transceiver 54 can also employ other geo-positioning mechanisms, including, but not limited to, triangulation, assisted GPS (AGPS), E-OTD, CI, SAI, ETA, BSS and the like, to further determine the physical location of mobile device 5 on the surface of the Earth. It is understood that under different conditions, GPS receiver 54 can determine a physical location within millimeters for mobile device 5; and in other cases, the determined physical location may be less precise, such as within a meter or significantly greater distances.

An optional camera 56 can capture images and/or video with a charge coupled device and/or other components. In this embodiment, digital image data is generally stored in data store 32 in one or more formats, such as joint photographic experts group (JPEG), graphic interchange format (GIF), motion picture experts group (MPEG), or the like.

Figure 2:
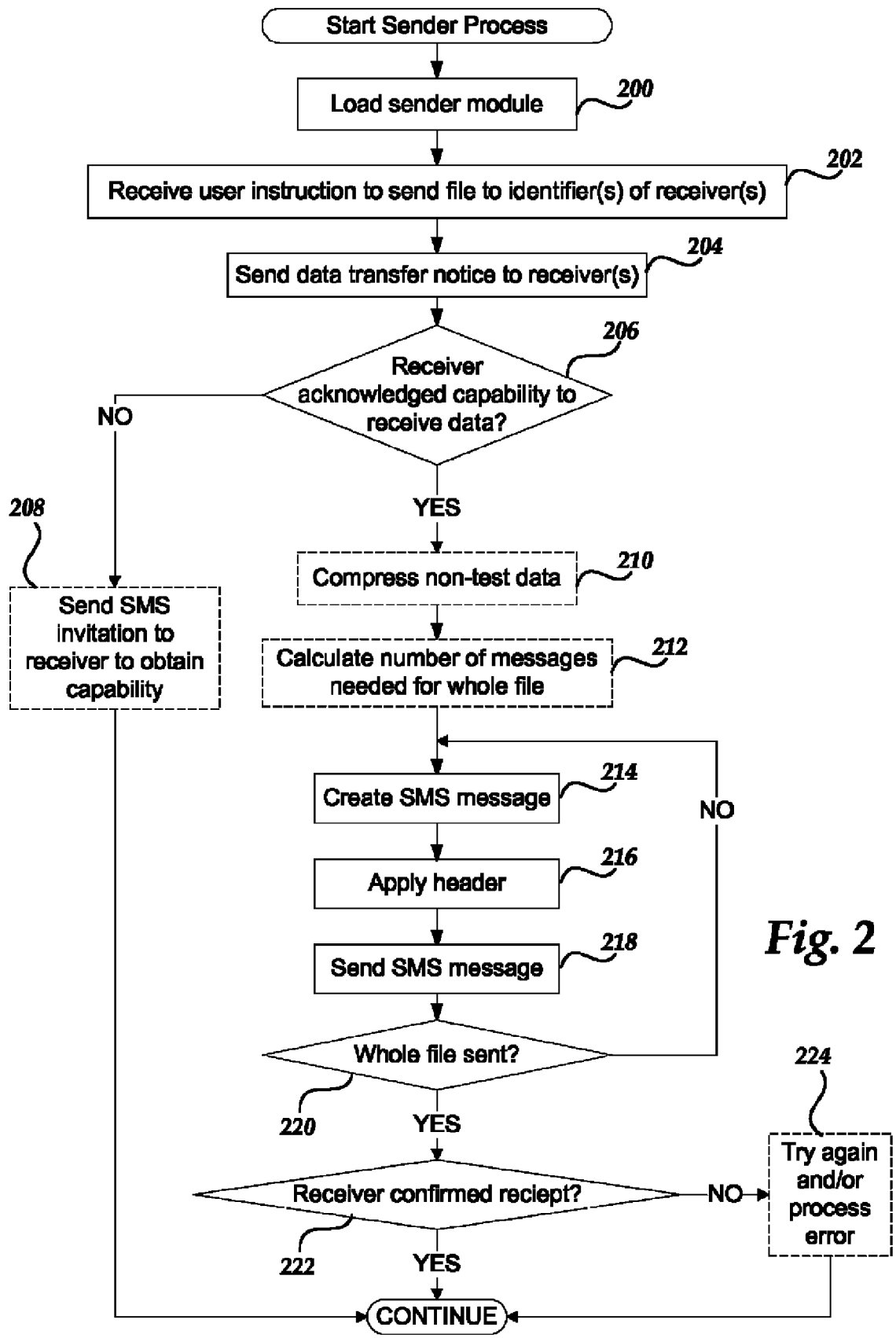
FIG. 2 is a flow diagram illustrating example logic of an embodiment for sending non-text data as a set of SMS text messages.

FIG. 2 is a flow diagram illustrating example logic of an embodiment for sending a non-text file as a set of SMS text messages. At an operation 200, a sender device, such as a mobile device, loads an SMS transport application that includes a sender module. The sender device may download the SMS transport application from a network server, may obtain the application from a permanent or removable memory, or the like. The application may be stand-alone or incorporated into another application such as of photo application, a browser, or the like. At an operation 202, the sender module receives a user instruction to send non-text data to one or more receiver devices. The non-text data may include image data, video data, audio data, or the like. The non-text data may also be a stream of video, audio or other data that may not have a currently known file size. The instruction may include one or more receiver identifiers, such as phone numbers, mobile identification numbers (MIN), messaging addresses, or the like. The user may also specify a source of the non-text data, such as a camera, a file directory location, a network node address, a URL, a file name, or the like.

At an operation 204, the sender module sends a data transfer notice to the one or more receivers to which the user wishes to transfer the non-text data. At a decision operation 206, the sender module waits for an acknowledgment from a receiver, indicating that the receiver has the capability to receive text data and convert it back to non-text data. If an acknowledgment is not received (e.g., within a predefined time limit), or if a response indicates that the receiver device does not have the conversion capability, the sender module may optionally send an invitation to the receiver device, at an optional operation 208, proposing that the receiver device obtain the capability from a network resource or other source. Processing is then concluded with relation to that receiver device.

If the receiver device acknowledges the capability, the sender module may optionally compress the non-text data, at an operation 210. At an optional operation 212, the sender module may calculate a total number of text messages that would be needed to transfer an entire non-text data file. This calculation may not be needed for streaming data, or the total number may not be used for the transfer. An alternative or additional operation may include specifying a start flag, or the like.

At an operation 214, the sender module transforms a portion of the non-text data into an SMS text message. Further details are provided with regard to FIG. 3. The sender module also applies a header to the SMS text message, at an operation 216. The header may include a message identifier, a total number of messages needed to transfer an entire non-text file, a data type of the non-text file, a start flag, an end flag, and indication that the text message is associated with other text messages, or the like. At an operation 218, the sender module sends the SMS text message. The sender module may check for confirmation that the SMS text message was properly received by the receiver device. If an error occurred, the sender module may resend the SMS text message and/or perform other error processing. If a confirmation is received, the sender module may delete the sent SMS text message to reduce memory usage. At a decision operation 220, the sender module determines whether all of the non-text data has been sent in text messages. If further non-text data remains, control returns to operation 214 to create another SMS text message.

Once all of the non-text data has been sent, the sender module may send a confirmation message to the receiver device or automatically receive a confirmation message from the receiver device. The sender module determines at a decision operation 220, whether the receiver device confirmed receipt of all associated text messages. If all text messages were not received, or other error occurred, the sender module may optionally notify the sending user, automatically try to send the messages again, and/or perform other error processing at an optional operation 224. After such processing, or if all text messages were received properly, processing continues with other operations.

Figure 3:
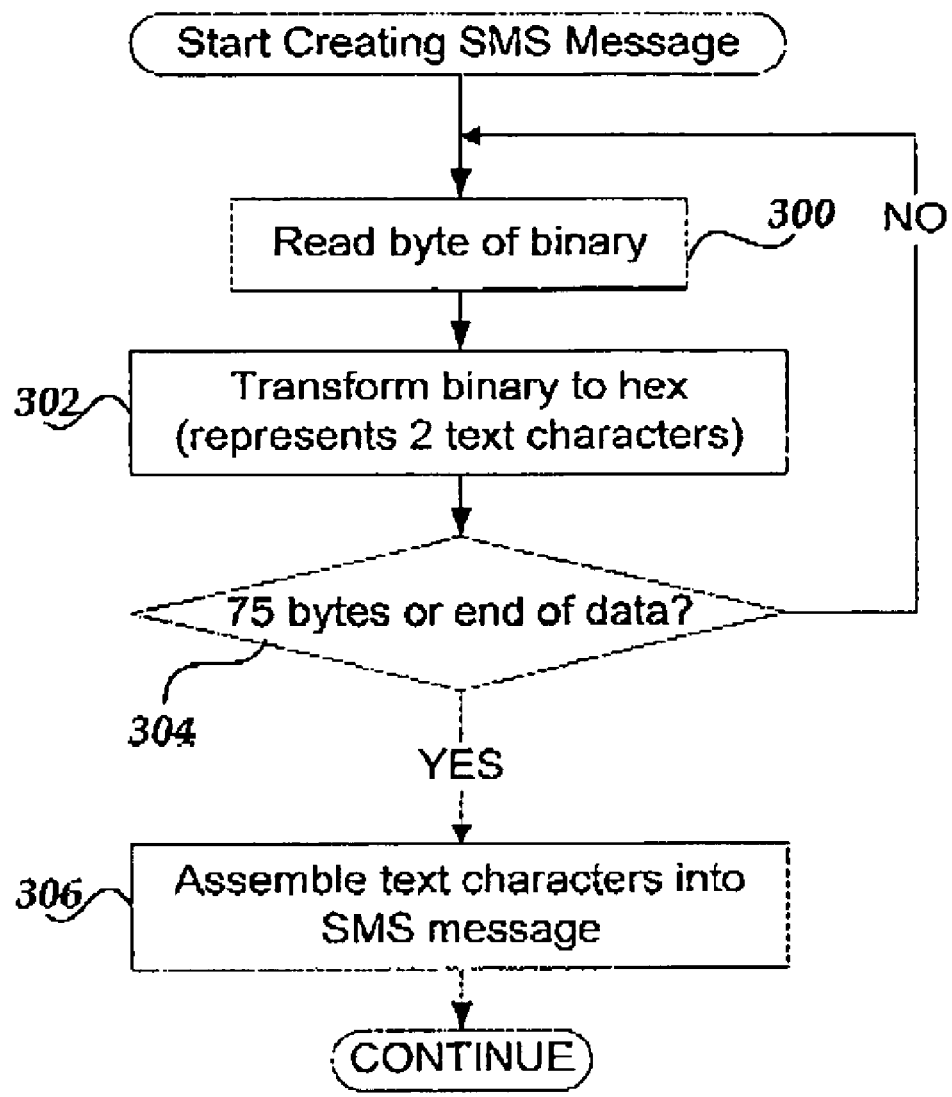
FIG. 3 is a flow diagram illustrating example logic of an embodiment for transforming non-text data to creating SMS text messages.

FIG. 3 is a flow diagram illustrating example logic of an embodiment for creating an SMS text message from a non-text data. This example logic provides further details of operation 214 in FIG. 2. At an operation 300 of FIG. 3, the sender module reads a byte of binary data from the non-text data that is to be transferred to a receiver device. In this embodiment, the byte comprises eight bits of binary data. For this embodiment, the sender module transforms the byte of binary data into hexadecimal data that represents two text characters. Any other textually representable form may be used, including decimal, binary, or the like. At a decision operation 304, the sender module determines whether the seventy-five bytes (75) of binary data have been transformed or if the and of the binary data has been reached. Seventy-five (75) bytes would correspond to 150 text characters, which is less than the conventional limited of one hundred and sixty (160) characters for SMS messages. If seventy-five (75) bytes have not yet been transformed, control returns to operation 300 two transform another bite of binary data. Once seventy-five (75) bytes have been transformed, or the end of the binary data has been reached, the sender module assembles the hexadecimal data of the resulting text characters into an SMS message, at an operation 306.

A receiver module in a receiver device performs similar, but generally reverse processing to decode received SMS messages of text characters back into the corresponding non-text binary data. In general, the receiver module searches an inbox of the receiver device for SMS messages that include an indication that the SMS messages are associated and/or that include text-coded, non-text data. In addition or alternatively, the receiver module may detect a start flag and/or other information in one or more headers of SMS messages as they are received, and begin transforming the received SMS messages into non-text data. From the header data and/or other evaluation of the received SMS messages, the receiver module may determine that the received SMS messages are not unsolicited spam messages. The receiver module may send one or more confirmations to the sender device that the SMS messages were received. Some SMS messages may be received out of order, so the receiver module may read sequence information from the headers and reorder the SMS messages and/or the decoded non-text binary data to properly reassemble the non-text data. The receiver module may also delete SMS messages after they have then transformed, to reduce memory usage. The receiver module may further decompress the non-text data or perform other operations on the received data.

The receiver module may also receive additional information from a server and/or other network node that is associated with the received SMS messages. For example, the SMS messages may be routed through a server that sends additional header information, advertising data, URL data, usage data, cost data, routing data, or the like. The server may also distribute the SMS messages to a number of receiver devices. In addition or alternatively, the server may calculate use its fees, convert the SMS messages into other messaging formats, store backup copies, transform the text data into non-text data, or the like. In another embodiment, the SMS messages may be sent to a general purpose computing device that includes a receiver module for transforming the SMS messages, and/or performing other operations.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for communicating data between devices over a network with a Short Message Service (SMS) protocol, comprising:
   providing a data transfer notice to a receiving device and enabling a transforming of non-text data into text data in response to determining an affirmative capability to convert text data into non-text data at the receiving device;

transforming a first portion of non-text data into a first subset of text data, wherein a number of text characters in the first subset is less than a maximum amount of text for a single message of an electronic messaging system;

communicating the first subset of text data in a first electronic message to the receiving device;

transforming a second portion of the non-text data into a second subset of text data, wherein a number of text characters in the second subset is less than the maximum for the single message of the electronic messaging system;

communicating the second subset of text data in a second electronic message to the receiving device and enabling each electronic message to be automatically deleted from both the client device after communication and the receiving device after transformation of the text data in each electronic message into non-text data occurs; and automatically resending to the receiving device each electronic message of non-text data that is determined to be unreceived by the receiving device over the network with the SMS protocol.

2. The method of claim 1, wherein the electronic messaging system comprises a short message service messaging system.

3. The method of claim 1, wherein transforming each of the first portion and the second portion comprises converting binary data to hexadecimal data that represents at least one text character.

4. The method of claim 1, further comprising applying a header to at least the first electronic message, wherein the header and the first subset together are at most equal to the maximum for the electronic messaging system.

5. The method of claim 4, wherein the header indicates at least one of the following:
an indication that the at least the first electronic message is associated with another electronic message;
a start flag;
a message identifier;
a data type;
a total number of electronic messages to communicate all of the non-text data; and
an end flag.

6. The method of claim 1, further comprising compressing the non-text data prior to transforming the first portion.

7. The method of claim 1, further comprising receiving an indication of whether a receiving device received at least one of the following:
the first electronic message;
a predetermined plurality of electronic messages; and
all electronic messages to communicate all of the non-text data.

8. The method of claim 1, further comprising indicating to a server the communication of at least the first electronic message.

9. A non-transitory computer readable medium, comprising executable instructions for causing an electronic device to perform the actions of claim 1.

10. A client device for sending communication over a network with a Short Message Service (SMS) protocol, comprising:
a processor;
a communication interface in communication with the processor and in communication with a network; and
a memory in communication with the processor and storing data and machine instructions that at least in part cause the processor to perform the operations of:

providing a data transfer notice to a receiving device and enabling a transforming of non-text data into text data in response to determining an affirmative capability to convert text data into non-text data at the receiving device;

transforming a first portion of non-text data into a first subset of text data, wherein a number of text characters in the first subset is less than a maximum amount of text for a single message of an electronic messaging system;

communicating the first subset of text data in a first electronic message to the receiving device;

transforming a second portion of the non-text data into a second subset of text data, wherein a number of text characters in the second subset is less than the maximum for the single message of the electronic messaging system;

communicating the second subset of text data in a second electronic message to the receiving device and enabling each electronic message to be automatically deleted from both the client device after communication and the receiving device after transformation of the text data in each electronic message into non-text data occurs; and automatically resending to the receiving device each electronic message of non-text data that is determined to be unreceived by the receiving device over the network with the SMS protocol.

11. The client of claim 10, wherein the electronic messaging system comprises a short message service messaging system.

12. The client of claim 10, wherein the non-text data comprises at least one of the following: image data and audio data.

13. The client of claim 10, wherein transforming each of the first portion and the second portion comprises converting binary data to hexadecimal data that represents at least one text character.

14. The client of claim 10, wherein the client comprises a mobile device.

15. A method for processing data on a device that is communicated over a network with a Short Message Service (SMS) protocol, comprising:
enabling conversion of text data into non-text data based at least on receiving a data transfer notice from another device;
receiving a first electronic message from the other device that includes:
a first subset of text data, wherein a number of text characters in the first subset is less than a maximum amount of text for a single message of an electronic messaging system; and
an indication that the first subset of text data was transformed from a first portion of non-text data;
receiving a second electronic message from the other device that includes:
a second subset of text data, wherein a number of text characters in the second subset is less than the maximum for the single message of the electronic messaging system; and
an indication that the second subset of text data was transformed from a second portion of the non-text data; and
enabling each electronic message to be automatically deleted from both the other device after communication and the device after transformation of the text data in each received electronic message into non-text data occurs;

performing an operation based at least in part on at least one of the following; the first electronic message and the second electronic message; and enabling the other device to automatically resend to the device each electronic message of non-text data that is determined to be unreceived by the device over the network with the SMS protocol.

16. The method of claim 15, wherein the operation comprises at least one of the following:

communicating at least one of the first electronic message and the second electronic message to at least one receiving device;

communicating an advertisement to at least one receiving device; and determining a fee.

17. A method for receiving data that is communicated over a network with a Short Message Service (SMS) protocol, comprising:

enabling conversion of text data into non-text data at a device based at least on receiving a data transfer notice from another device;

receiving a first electronic message from the other device that includes a first subset of text data;

transforming the first subset of text data into a first portion of non-text data, wherein a number of text characters in the first subset is less than a maximum amount of text for a single message of an electronic messaging system;

receiving a second electronic message from the other device that includes a second subset of text data;

transforming the second subset of text data into a second portion of the non-text data, wherein a number of text characters in the second subset is less than the maximum for the single message of the electronic messaging system;

enabling each electronic message to be automatically deleted from both the other device after communication and the device after transformation of the text data in each received electronic message into non-text data occurs; and automatically resending to the receiving device each electronic message of non-text data that is determined to be unreceived by the receiving device over the network with the SMS protocol.

18. The method of claim 17, wherein the electronic messaging system comprises a short message service messaging system.

19. The method of claim 17, further comprising assembling the first portion of non-text data together with at least the second portion of non-text data.

20. The method of claim 19, further comprising rendering the non-text data for a user.

21. A non-transitory computer readable medium, comprising executable instructions for causing an electronic device to perform the actions of claim 19.

* * * * *

UNITED STATES PATENT AND TRADEMARK OFFICE
CERTIFICATE OF CORRECTION

| | | |
|---|---|---|
| PATENT NO. | : 8,050,693 B2 | Page 1 of 1 |
| APPLICATION NO. | : 11/695340 | |
| DATED | : November 1, 2011 | |
| INVENTOR(S) | : Rahul Nair | |

It is certified that error appears in the above-identified patent and that said Letters Patent is hereby corrected as shown below:

On the Title Page, item (57), in Abstract, in column 2, line 13, delete "it" and insert -- its --, therefor.

Signed and Sealed this
Twentieth Day of March, 2012

David J. Kappos
*Director of the United States Patent and Trademark Office*